(12) United States Patent
Castan Lavilla et al.

(10) Patent No.: US 11,024,291 B2
(45) Date of Patent: Jun. 1, 2021

(54) REAL-TIME CLASS RECOGNITION FOR AN AUDIO STREAM

(71) Applicant: SRI International, Menlo Park, CA (US)

(72) Inventors: Diego Castan Lavilla, Mountain View, CA (US); Harry Bratt, Mountain View, CA (US); Mitchell Leigh McLaren, Alderley (AU)

(73) Assignee: SRI INTERNATIONAL, Menlo Park, CA (US)

( * ) Notice: Subject to any disclaimer, the term of this patent is extended or adjusted under 35 U.S.C. 154(b) by 89 days.

(21) Appl. No.: 16/366,751

(22) Filed: Mar. 27, 2019

(65) Prior Publication Data

US 2020/0160845 A1    May 21, 2020

Related U.S. Application Data

(60) Provisional application No. 62/770,062, filed on Nov. 21, 2018.

(51) Int. Cl.
*G10L 17/00* (2013.01)
*G10L 15/08* (2006.01)
(Continued)

(52) U.S. Cl.
CPC ............ *G10L 15/08* (2013.01); *G10L 15/005* (2013.01); *G10L 15/04* (2013.01); *G10L 15/16* (2013.01); *G10L 17/06* (2013.01); *G10L 17/18* (2013.01)

(58) Field of Classification Search
CPC ................................ G10L 17/00; G10L 17/03
See application file for complete search history.

(56) References Cited

U.S. PATENT DOCUMENTS

| 5,606,643 A | 2/1997 | Balasubramanian |
| 5,655,058 A | 8/1997 | Balasubramanian |

(Continued)

OTHER PUBLICATIONS

Wang, Quan, et al. "Speaker diarization with lstm." 2018 IEEE International Conference on Acoustics, Speech and Signal Processing (ICASSP). IEEE, Apr. 2018. (Year: 2018).*

(Continued)

*Primary Examiner* — Jialong He
(74) *Attorney, Agent, or Firm* — Hickman Becker Bingham Ledesma LLP; Christine E. Orich

(57) ABSTRACT

In an embodiment, the disclosed technologies include automatically recognizing speech content of an audio stream that may contain multiple different classes of speech content, by receiving, by an audio capture device, an audio stream; outputting, by one or more classifiers, in response to an inputting to the one or more classifiers of digital data that has been extracted from the audio stream, score data; where a score of the score data indicates a likelihood that a particular time segment of the audio stream contains speech of a particular class; where the one or more classifiers use one or more machine-learned models that have been trained to recognize audio of one or more particular classes to determine the score data; using a sliding time window process, selecting particular scores from the score data; using the selected particular scores, determining and outputting one or more decisions as to whether one or more particular time segments of the audio stream contain speech of one or more particular classes; where the one or more decisions are outputted within a real-time time interval of the receipt of the audio stream; where the one or more decisions are used by downstream processing of the audio stream to control any one or more of the following: labeling the audio stream, segmenting the audio stream, diarizing the audio stream.

33 Claims, 7 Drawing Sheets

(51) Int. Cl.
  *G10L 15/04* (2013.01)
  *G10L 17/18* (2013.01)
  *G10L 15/00* (2013.01)
  *G10L 15/16* (2006.01)
  *G10L 17/06* (2013.01)

(56) References Cited

U.S. PATENT DOCUMENTS

| | | |
|---|---|---|
| 5,659,662 A | 8/1997 | Wilcox |
| 5,839,103 A | 11/1998 | Mammone |
| 6,404,925 B1 | 6/2002 | Foote |
| 6,434,520 B1 | 8/2002 | Kanevsky |
| 6,774,917 B1 | 8/2004 | Foote |
| 7,039,951 B1 | 5/2006 | Chaudhari |
| 7,861,169 B2 | 12/2010 | Hull |
| 8,326,623 B2 | 12/2012 | Fujii |
| 8,392,004 B2 | 3/2013 | Matsuda |
| 8,600,741 B2 | 12/2013 | Talwar |
| 9,275,635 B1 | 3/2016 | Beaufays |
| 9,571,652 B1 | 2/2017 | Zeppenfeld |
| 9,871,606 B1 | 1/2018 | Carroll |
| 2002/0028021 A1 | 3/2002 | Foote |
| 2002/0080286 A1 | 6/2002 | Dagtas |
| 2004/0064314 A1 | 4/2004 | Aubert |
| 2004/0111261 A1 | 6/2004 | Chaudhari |
| 2004/0167767 A1 | 8/2004 | Xiong |
| 2004/0181747 A1 | 9/2004 | Hull |
| 2005/0004690 A1 | 1/2005 | Zhang |
| 2005/0068568 A1 | 3/2005 | Hart |
| 2006/0065102 A1 | 3/2006 | Xu |
| 2006/0133666 A1 | 6/2006 | Liu |
| 2006/0149693 A1 | 7/2006 | Otsuka |
| 2007/0071206 A1 | 3/2007 | Gainsboro |
| 2007/0276733 A1 | 11/2007 | Geshwind |
| 2007/0297682 A1 | 12/2007 | Zhang |
| 2008/0300867 A1 | 12/2008 | Yan |
| 2009/0037179 A1 | 2/2009 | Liu |
| 2009/0043573 A1 | 2/2009 | Weinberg |
| 2010/0070276 A1 | 3/2010 | Wasserblat |
| 2010/0198598 A1 | 8/2010 | Herbig |
| 2011/0082874 A1 | 4/2011 | Gainsboro |
| 2011/0258547 A1 | 10/2011 | Symons |
| 2011/0320197 A1 | 12/2011 | Conejero |
| 2012/0029668 A1 | 2/2012 | Kim |
| 2012/0095764 A1 | 4/2012 | Jeon |
| 2012/0131088 A1 | 5/2012 | Liu |
| 2012/0155663 A1 | 6/2012 | Weinberg |
| 2012/0185068 A1 | 7/2012 | Eppolito |
| 2012/0253794 A1 | 10/2012 | Chun |
| 2012/0263285 A1 | 10/2012 | Rajakumar |
| 2013/0144414 A1 | 6/2013 | Kajarekar |
| 2013/0166295 A1 | 6/2013 | Shriberg |
| 2014/0039890 A1 | 2/2014 | Mundt |
| 2014/0088961 A1 | 3/2014 | Woodward |
| 2014/0095166 A1 | 4/2014 | Bell |
| 2014/0172426 A1 | 6/2014 | Aratsu |
| 2014/0195236 A1 | 7/2014 | Hosom |
| 2014/0201631 A1 | 7/2014 | Pornprasitsakul |
| 2014/0247926 A1 | 9/2014 | Gainsboro |
| 2014/0297280 A1 | 10/2014 | Verma |
| 2014/0337027 A1 | 11/2014 | Ide |
| 2015/0112682 A1 | 4/2015 | Rodriguez |
| 2015/0149165 A1 | 5/2015 | Saon |
| 2015/0199960 A1* | 7/2015 | Huo ............... G10L 15/063 704/245 |
| 2015/0227510 A1 | 8/2015 | Shin |
| 2015/0279372 A1 | 10/2015 | Papierman |
| 2015/0356974 A1 | 12/2015 | Tani |
| 2015/0381801 A1 | 12/2015 | Rajakumar |
| 2016/0019889 A1 | 1/2016 | Alvarez Guevara |
| 2016/0086599 A1 | 3/2016 | Kurata |
| 2016/0093315 A1 | 3/2016 | Kikugawa |
| 2016/0098987 A1* | 4/2016 | Stolcke ........... G10L 15/063 704/232 |
| 2016/0124596 A1 | 5/2016 | Doerring |
| 2016/0142787 A1 | 5/2016 | Mohamed |
| 2016/0180852 A1 | 6/2016 | Huang |
| 2016/0182851 A1 | 6/2016 | Girgensohn |
| 2016/0283185 A1* | 9/2016 | McLaren ............ G06F 16/60 |
| 2016/0321029 A1 | 11/2016 | Zhang |
| 2017/0084295 A1* | 3/2017 | Tsiartas ............ G10L 17/02 |
| 2017/0134819 A9 | 5/2017 | Mohamed |
| 2018/0012604 A1 | 1/2018 | Guevara |
| 2018/0027351 A1 | 1/2018 | Cartwright |
| 2018/0166066 A1* | 6/2018 | Dimitriadis ......... G10L 25/78 |
| 2019/0304470 A1* | 10/2019 | Ghaemmaghami ..... G10L 17/06 |
| 2020/0152207 A1* | 5/2020 | Wang ............... G10L 17/18 |

OTHER PUBLICATIONS

Reynolds, Douglas A., Thomas F. Quatieri, and Robert B. Dunn. "Speaker verification using adapted Gaussian mixture models." Digital signal processing 10.1-3 (2000): 19-41.

Alexander et al., "Voice Carving—Forensic Application of Automatic Speaker Segmentation", dated 2010, http://www.oxfordwaveresearch.com/our-r-and-d/articles-and-abstracts, 9 pages.

McLaren, U.S. Appl. No. 14/671,918, filed Mar. 27, 2015, Office Action, dated Feb. 24, 2017.

McLaren, U.S. Appl. No. 14/671,918, filed Mar. 27, 2015, Office Action, dated Feb. 28, 2018.

McLaren U.S. Appl. No. 14/671,918, filed Mar. 27, 2015, Notice of Allowance, dated Jul. 19, 2018.

McLaren U.S. Appl. No. 14/671,918, filed Mar. 27, 2015, Office Action, dated Sep. 22, 2017.

* cited by examiner

REAL-TIME CLASS RECOGNITION FOR AN AUDIO STREAM

BENEFIT CLAIM

This application claims the benefit of Provisional Appln. 62/770,662, filed Nov. 21, 2018, the entire contents of which is hereby incorporated by reference as if fully set forth herein, under 35 U.S.C. § 119(e).

GOVERNMENT RIGHTS

This invention was made with Government support under contract number HR0011-15-C-0037 awarded by the Defense Advanced Research Projects Agency. The Government has certain rights in the invention.

TECHNICAL FIELD

Technical fields of this disclosure include computational methods for automating the classification of an audio signal. Other technical fields of this disclosure include automated language and speaker classification, audio segmentation and audio diarization.

BACKGROUND

Computers have been used to segment and diarize speech signals. Most prior speech segmentation and diarization systems are based on clustering techniques.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Figure 1:
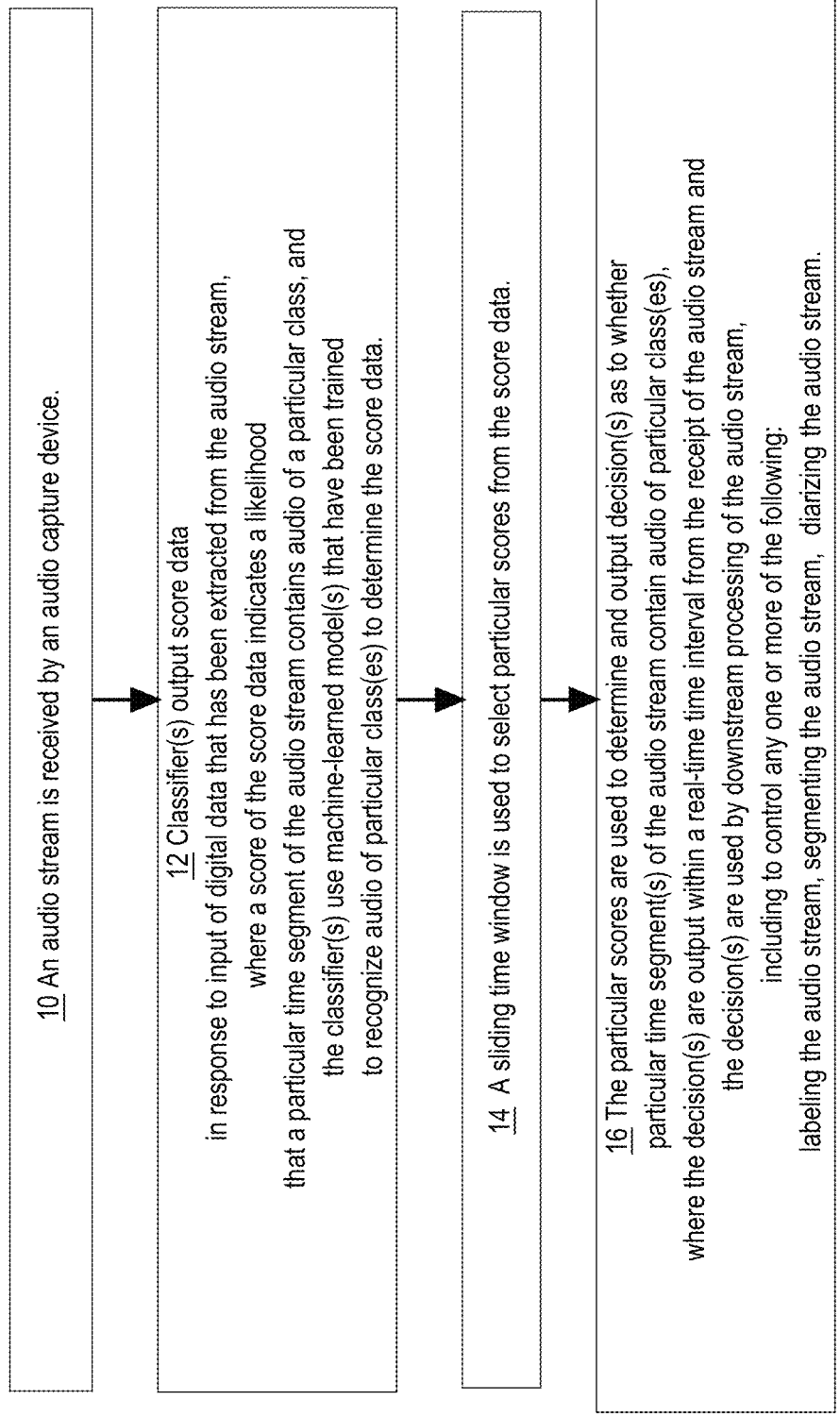
FIG. 1 is a flow diagram of a process, in an embodiment.

While the present invention is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the spirit and scope of the present invention as defined by the appended claims.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

One shortcoming of certain prior art systems is that no speech content classification is made until the audio segmentation process is complete. For example, some prior art systems do not output any speech content classification label at all until the size of the corresponding segment to which the label applies is finally determined.

Consequently, the prior approaches can lead to unacceptable delays between receipt of an audio sample and the output of a label indicating the classification of its speech content. Particularly in a live streaming environment, using prior approaches, speech content classification delays can accumulate because the incoming portion of an audio stream cannot be labeled until the system has finished labeling the previously received portion of the audio stream.

When such computational delays happen, user experience is poor because the system takes a long time to output the labels. Additionally, in prior approaches, user confidence in the system-generated classifications suffers because a label that is output may not correspond to the speech content of the portion of audio that is currently being streamed but rather to a previously received portion of the audio.

Embodiments of this disclosure address the need for real-time classification of audio streams by providing an approach in which classifier(s) are applied directly to digital data extracted from the audio stream, such that output of the classifier(s) can be used by downstream processing of the audio signal, for example to control the labeling, segmentation, and/or diarization of the audio stream. In an embodiment, this disclosure addresses the need to automatically classify live audio streams in a real time environment because, using the disclosed approaches, speech content classification labels can be output quickly so that they correspond to the portion of the audio currently being perceived. In some embodiments, the disclosed approaches are used specifically to perform speaker and/or language identification in real time.

This disclosure also addresses the need for accurate and reliable real-time speaker and/or language identification in cases where there are multiple speakers and/or multiple languages in the same audio stream.

As used herein, the term real time may refer to an actual period of time during which a process or event occurs. For example, real time may refer to the ability of a computer system to receive an input and analyze and provide virtually immediate output in response to the input. In the context of audio processing, real-time often indicates that the amount of time to process an example of N seconds of audio takes N seconds. In some embodiments, real-time may refer to faster than real time processing that results in a real-time experience for the end user (for example, the processing can keep up with an infinite incoming stream of audio). In some embodiments, real time is measured in milliseconds. In other embodiments, real time is determined based on an end user's perception of system responsiveness.

In an embodiment, the disclosed technologies utilize a segmentation-by-classification approach in which segmentation of the audio stream is the result of, rather than a precursor to, a real-time classification. The disclosed technologies thereby can perform, for example, language identification and/or speaker identification in real-time. While this disclosure refers to specific examples that deal with speaker and language identification, for illustration purposes, it should be understood that the disclosed technologies can be equally applied to other audio content classification tasks, including but not limited to audio event detection, keyword detection, emotion detection, and/or others.

Using the disclosed segmentation-by-classification approach, in an embodiment, transitions between semantic classes, for example different languages and/or different speakers, are based on decisions of one or more semantic classifiers. In an embodiment, the disclosed approach enables tracking of changes in the speaker and language over various time intervals of the audio stream, such that segments can be defined flexibly, for example by speaker, by language, by language and speaker, or otherwise as need for a particular task or application.

To do this, in an embodiment, a deep neural network (DNN) classifier is used to perform one or more semantic classifications on one or more portions of the audio stream. An output of the DNN classifier indicates a mathematical likelihood of the presence of a particular semantic class in the audio stream. Examples of DNN output include probabilistic or statistical predictive data values for each target class, where a target class corresponds to, for example, an enrolled language or an enrolled speaker. Thus, in an embodiment, the DNN classifier outputs mathematical likelihoods of the presence, in the audio stream, of each language of a set of target languages and/or mathematical likelihoods of the presence, in the audio stream, of each speaker of a set of target speakers.

In an embodiment, the disclosed technologies identify particular semantic content and content transitions in the audio stream based on the DNN outputs that indicate likelihoods of semantic classes. In an embodiment, based on transitions that have been identified using the machine learning based classifiers, the disclosed technologies determine whether or when to end a segment of the audio stream and whether or when to begin another segment of the audio stream, using the DNN output. In an embodiment, these segmentation decisions are made by performing one or more mathematical computations on the DNN output. The mathematical computations include one or more computations that result in a set of soft decisions, or one or more computations that result in a set of hard decisions, or one or more computations that result in a combination of hard and soft decisions.

Benefits

The disclosed technologies improve upon and provide benefits over prior methods. In some embodiments, the disclosed technologies can reduce the latency between receipt of an audio sample and output of a speech content class label for that same audio sample. Particularly in a live setting, the reduced latency can greatly enhance the user experience and improve user confidence in the output of the system. In some embodiments, the disclosed technologies can be used to automatically recognize and provide class labels for multiple different content classes, such as multiple speakers and/or multiple languages in a stream of live continuous speech, as the speech is being spoken, with low latency. Thus, the disclosed technologies can be used in applications, such as live streaming, for which existing technologies are unsuitable.

Embodiments of the disclosed technologies can be used to improve close captioning, forensic analysis, automatic translation, and/or automatic transcription services in the context of live multi-language and/or multi-speaker audio streams. In some embodiments, the disclosed technologies can be used to improve the interpretations of live speech that are made by speech-enabled smart devices configured with general purpose and/or domain-specific chat bots or automated intelligent assistants.

Embodiments of the disclosed technologies can be used to improve applications and/or devices including but not limited to government, military, business, telecommunications, instant messaging, audio recording, indexing, playback, video recording, audio and/or video conferencing, asynchronous communications, social media, call centers, robotics, autonomous systems, Internet of Things, smart phones, smart appliances, network security, user interface design.

Embodiments of the disclosed technologies are designed to be part of a system that is used in conditions where multiple speakers are engaged in conversation and where one or more particular speakers may be speaking in different languages. In one exemplary embodiment, the disclosed technologies may be used by a transcription company that has to produce accurate transcriptions of live, multi-speaker and multi-lingual events, such as the European Parliament or the United Nations. In these and other multi-speaker, multi-language live contexts, embodiments of the system are able to identify the target classes in real-time using, for example, the disclosed approach of computing a set of soft solutions, or a set of hard solutions, or a combination of hard and soft solutions.

In the following description, reference may be made to terms such as sample, window, and segment. In an embodiment, sample may refer to a temporal portion of digital data extracted from an audio stream, window may refer to a time interval over which features are extracted or scores are computed for a sample (such as the first 2 seconds of an 8 second sample); and segment may refer to a portion of the audio stream that contains one or more content classes. A content class may be for example, a speaker, a language, or another characteristic of the speech content of the segment that can be labeled. Thus, in some embodiments, a segment may extend across multiple samples or time windows or be contained within a single sample or time window.

As an example, a start time of a segment may be defined by a start time or an end time of a particular class of speech content contained in the segment, and an end time of that same segment may be defined by a start time or an end time of the same content class or a different content class. For instance, a start time of a segment may be the time at which speaker 1 starts speaking in a first language while the end time of the same segment may be the time at which speaker 1 finishes speaking in a different language. For instance, any segment produced by the disclosed technologies may contain speech belonging to any one or more content classes, e.g., a single speaker, a single language with multiple unknown speakers, a single speaker speaking a particular language, etc. The disclosed technologies enable flexible, content-based segmentations in this manner.

Process Overview

FIG. 1 illustrates an example process 100 in which aspects of the present disclosure may be implemented. Process 100 is implemented in software, hardware, or a combination of software and hardware. In an embodiment, process 100 is embodied in computer program code schematically depicted in FIG. 2 as a number of software-based components that include digital data 50, classification model(s) 52, classifier software 54, post-processing software 58, described in more detail below. The software-based component(s) in which process 100 is embodied are executable by processor(s); for example by computing device(s) 110, 140, 142, 144 shown in FIG. 3, described in more detail below.

In operation 10, process 100 receives an audio stream is received via an audio capture device, such as audio capture device 144. Examples of audio streams that may be received in operation 10 include live speech, non-speech sounds, such as background noise, music, and combinations of speech and non-speech sounds. Live speech received in operation 10 may include a single speaker or a combination of multiple different speakers. Live speech received in operation 10 may include speech that is spoken in multiple different languages.

In an embodiment, a sample that is analyzed by the classifier software includes digital data that has been extracted from a temporal window of the audio stream. The temporal window, and thus the digital data included in the sample, is defined by a time interval, e.g., a number of seconds. The digital data includes particular features that are selected based on the particular classification task (i.e., speaker recognition, language recognition, etc.). Features that may be included in the digital data may include, for example, but are not limited to bottleneck features. Examples of techniques for obtaining bottleneck features are described in U.S. Pat. No. 10,133,538 to McLaren et al. and U.S. Patent Application Publication No. 2016-0248768 to McLaren et al.

In an embodiment, the size of the temporal window is fixed while in another embodiment, the size of the temporal window is variable. In an embodiment, the size of the temporal window corresponds to the entire length or duration of the audio stream. In another embodiment, the size of the temporal window is a parameter that is determined in accordance with a segmentation approach that is used. For example, the duration of the temporal window may be set in accordance with the segmentation approach, as explained in more detail below, and increased or decreased in response to various conditions.

In some embodiments, the size of the temporal window, which is used to determine the sample that is input to the classifier software, is determined independently of or without the use of any audio segmentation. That is, the sample that is input to the classifier software to produce classification scores is not defined by, produced by or based on output of any audio segmentation process, in an embodiment. Thus, in some embodiments, the classification software operates on non-homogenous samples of the audio stream that may contain multiple different speakers and/or multiple different languages, for example.

In an embodiment, a particular sample or sub-sample to which a particular score relates is defined by a temporal sub-window whose size is smaller than the size of the temporal window used to determine the sample. In other words, the temporal sub-window size used to determine a sub-sample corresponds to a shorter duration of the audio stream than the temporal window size used to determine the sample. In some embodiments, the particular sub-sample is defined by applying a mathematical operation to the time interval.

A sub-sample may include a subset of the digital data that is extracted from the sample, or a sub-sample may include a portion of the digital data of two different temporally adjacent samples (i.e., temporal sub-window of a sub-sample can overlap neighboring samples of the audio stream, in some cases).

In an embodiment, the classifier software outputs sub-scores for each sub-sample, whatever the size of the temporal sub-window used to determine the sub-sample or the size of the temporal window used to determine the sample. To compute the sub-score, the classifier software uses any one or more of the following: a machine learning model, a neural network, a deep neural network, one or more bottleneck features, one or more models trained to recognize at least two different languages, one or more models trained to recognize at least two different speakers, in an embodiment.

In operation 12, classifier(s) output score data in response to input of digital data that has been extracted from the audio stream. A score of the score data indicates a likelihood that a particular time segment of the audio stream contains audio of a particular class. In an embodiment, the score is a likelihood ratio. The classifier(s) use machine-learned model (s) that have been trained to recognize audio of particular class(es) to determine the score data. In an embodiment, the machine-learned model(s) are created by an enrollment process whereby an enrolled model corresponds to an enrolled class, such that a label indicates a set of features that are associated with a particular class. Enrollment can be performed by associating features of a small sample of audio of a known class with the corresponding class label. For example, an audio sample of a known speaker or a known language can be enrolled by associating the corresponding label with characteristic features of the sample.

In some embodiments, process 100 uses the score data that are output by operation 12 to produce a set of labels, where the labels identify, in the audio stream, particular classes of speech content found to be present in the audio stream and/or transitions between different speakers and/or transitions between different languages.

In an embodiment, a label is determined by applying a mathematical operation to score data, for example the set of sub-scores, to produce a decision. In another embodiment, the label is determined by comparing a portion of the score data to a threshold. In yet another embodiment, the label is determined by taking the maximum value of scores in the score data.

In operation 14, a sliding time window is used to select particular scores from the score data as the score data is output by the classifier(s). For example, scores may be extracted and analyzed for each of four consecutive 2-second time intervals up to a total time window of 8 seconds, and then the total time window is shifted by 2 seconds, so that the initial time window includes data for the first 0-8 seconds of audio stream, the next time window includes data for seconds 2-10 of the audio stream, and so on.

In operation 16, the particular scores are used to determine and output decision(s) as to whether particular time segment(s) of the audio stream contain audio of particular class(es), where the decision(s) are output within a real-time time interval from the receipt of the audio stream and the decision (s) are used by downstream processing of the audio stream, including to control any one or more of the following: labeling the audio stream, segmenting the audio stream, diarizing the audio stream.

Figure 6A:
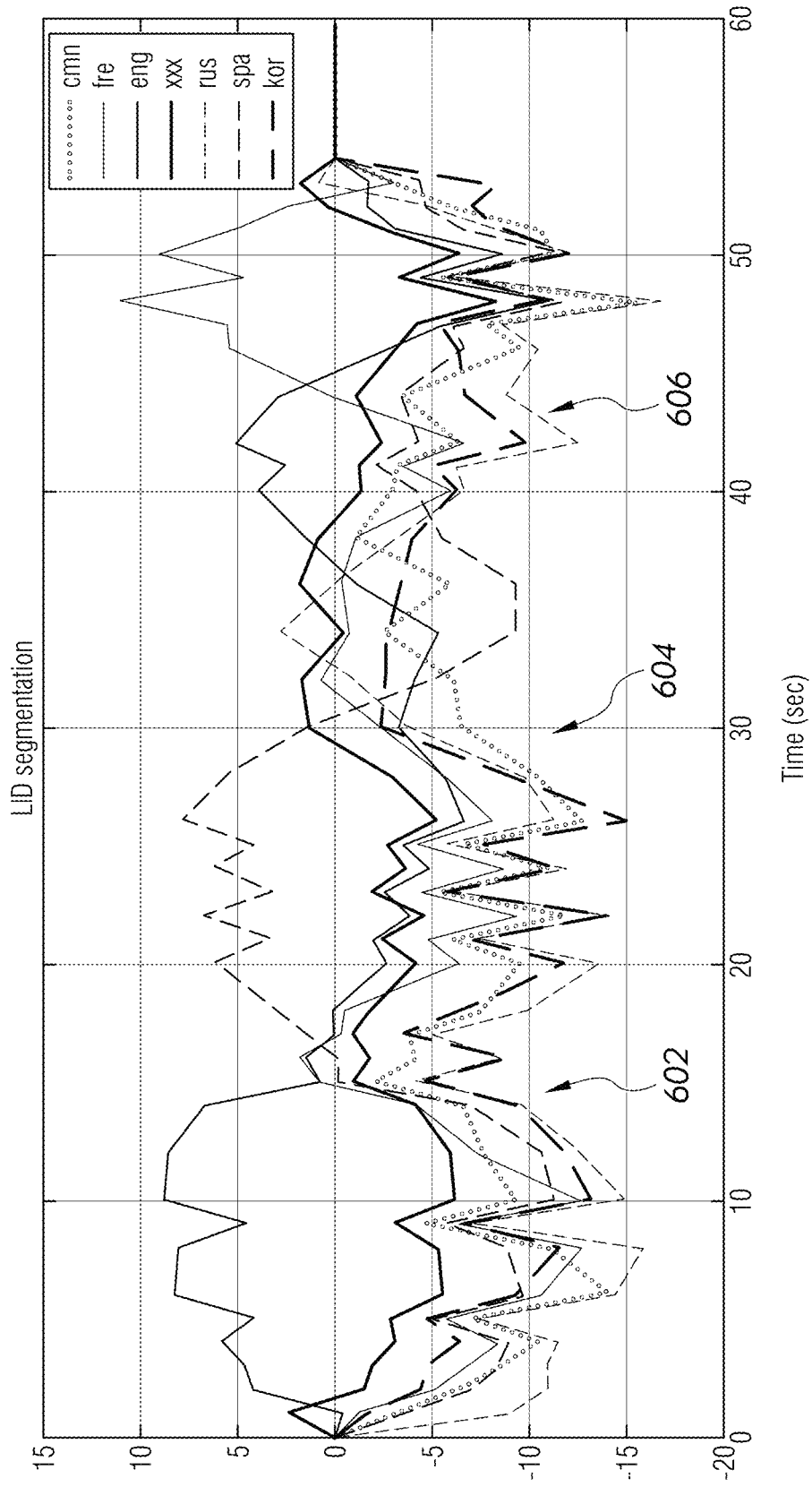
FIG. 6A and FIG. 6B are plots of illustrative test results, in an embodiment.
Figure 6B:
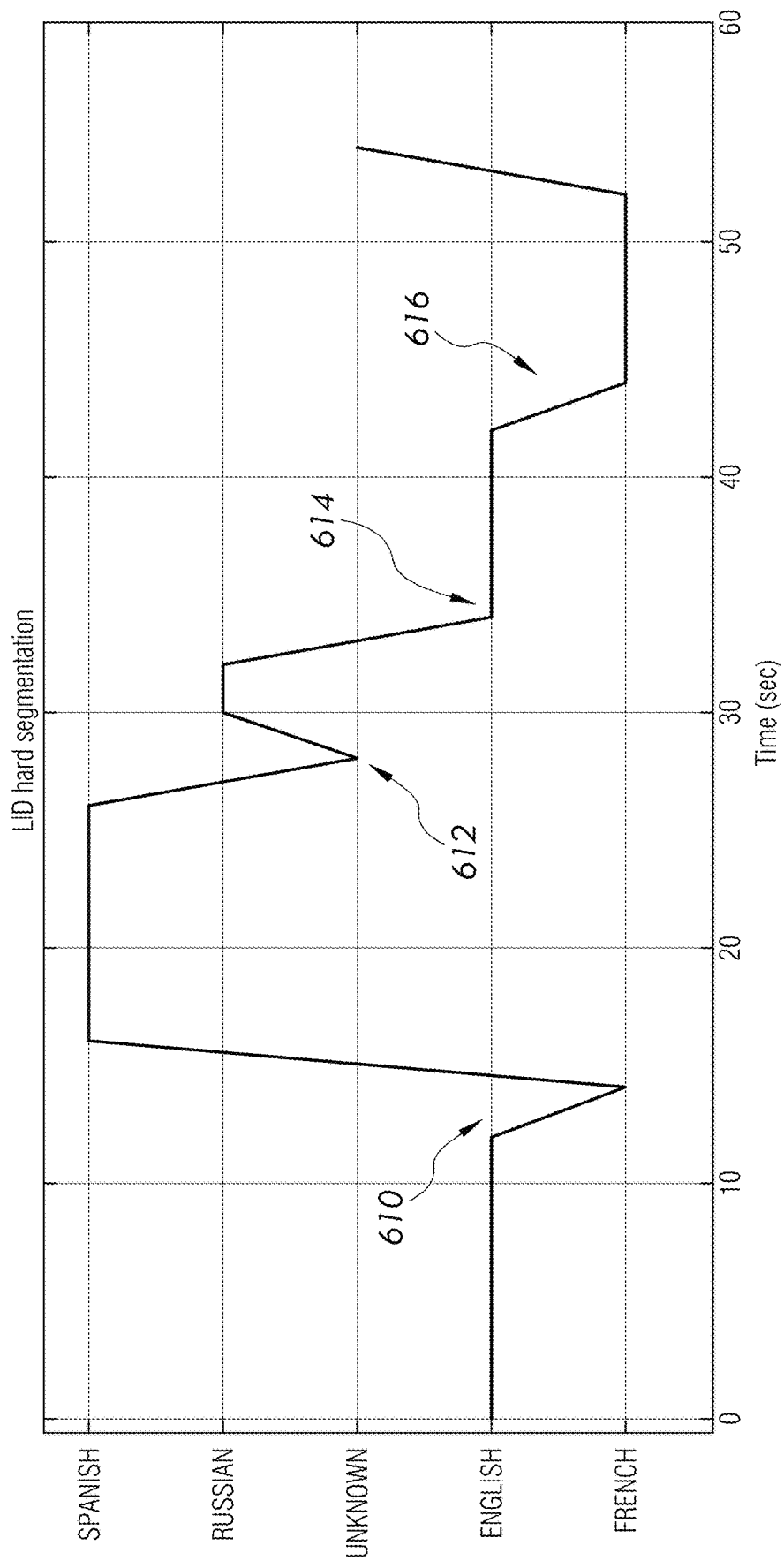

In some embodiments, operation 16 uses a soft computational approach. In other embodiments, operation 16 uses a hard computational approach. In other embodiments, operation 16 uses a combination of a hard computational approach and a soft computational approach. Descriptions of soft and hard computational approaches follow below. Plots that illustrate output of operation 16 for both soft and hard solutions are shown in FIGS. 6A and 6B, respectively, described below.

Soft Solution

In an embodiment of the soft solution, sub-scores are extracted from the output of the classifier software over an N-second window that is shifted X seconds for each score. Classification decisions are taken from the middle point of the N-second temporal window. That is, operation 16 takes the classifier output that is computed at the timestamp that is N/2. For example, if the window is 0-8 seconds, the decision is taken at 4 seconds. If the window is 2-10 seconds, the decision is taken at 6 seconds. In an embodiment, the decision is computed by interpolating a likelihood of values for each class using, for example, a likelihood ratio or log likelihood ratio.

A transition period occurs until the window reaches its maximum size. During this transition, a buffer is loaded with X-second chunks (or sub-samples) of speech from the audio stream until the buffer reaches the maximum window size. For example, for an 8-second window, the temporal sub-windows would be 2 seconds in duration and the chunks would begin at 4 seconds, 6 seconds and 8 seconds.

The decision points during the transition period are, in the above example, at 1 second, 2 seconds, 3 seconds, and 4 seconds, respectively. In other words, the decision point is in the middle of each of the sub-windows. For the next 8-second window, e.g., a sample extracted from [2 sec-10 sec] of the audio stream, the decision point is at 6 seconds. The likelihood values for each class (e.g., language ID or speaker ID) in intermediate decision points are interpolated as the window grows. This process can be continued until the end of the audio stream.

In an embodiment, the above process is run on speech audio only. That is, the audio sample is pre-processed using a speech activity detection (SAD) process, which indicates window boundaries such that a window does not include audio that the SAD process identifies as non-speech. So if the sample contains 10 minutes of audio, and at most 6 seconds of continuous speech, the size of any window or sub-window analyzed will be less than or equal to 6 seconds. In some embodiments, such as condition prediction applications, the SAD process may be omitted such that the sample analyzed may contain non-speech audio.

Hard Solution

In an embodiment, the hard solution takes the maximum value of each class (e.g., language and/or speaker) and the hard decision is the detected class (e.g., language and/or speaker) from the beginning of the window until the middle of the window. If the decision is unknown language (model composed of non-target languages), the decision of the middle frame can be skipped until the next window.

Label Output

Some embodiments output the labels produced by the disclosed technologies to a graphical user interface or to other downstream processes, such as diarization or automatic speech recognition. The labels identify classes of speech content present in the audio stream and/or the transitions between the classes that were identified by operation 16. Examples of the types of transitions that may be identified by operation 16 include: a single speaker switching from one language to another, a first speaker speaking in a first language followed by a second speaker speaking in a different language, multiple speakers speaking the same language, multiple speakers speaking different languages, multiple speakers some of which are speaking the same language and others of which that are speaking a different language, multiple speakers switching between different languages at different times.

In an embodiment, operation 16 or downstream processing includes concurrently displaying, in a graphical user interface, a waveform of the audio stream, a first label that links a first speaker with a first portion of the waveform, and a second label that links a first language with a second portion of the waveform. In an embodiment, the second portion of the waveform is a sub-portion of the first portion of the waveform. In an embodiment, operation 12 further includes concurrently displaying a third label that links a second language with a third portion of the waveform. In an embodiment, the third portion of the waveform is a sub-portion of the first portion of the waveform.

Similarly, in an embodiment, operation 12 includes concurrently displaying, in a graphical user interface, a waveform of the audio stream, a first label that links a first language with a first portion of the waveform, and a second label that links a first speaker with a second portion of the waveform. In an embodiment, the second portion of the waveform is a sub-portion of the first portion of the waveform. In an embodiment, operation 12 further includes concurrently displaying a third label that links a second speaker with a third portion of the waveform. In an embodiment, the third portion of the waveform is a sub-portion of the first portion of the waveform.

In some embodiments, operation 16 or downstream processing includes concurrently displaying, in a graphical user interface, a waveform of the audio stream, a first label that links a first speaker with a first portion of the waveform, a second label that links a second speaker with a second portion of the waveform; a third label that links a first language with the first portion of the waveform, and a fourth label that links a second language with the second portion of the waveform.

Figure 4:
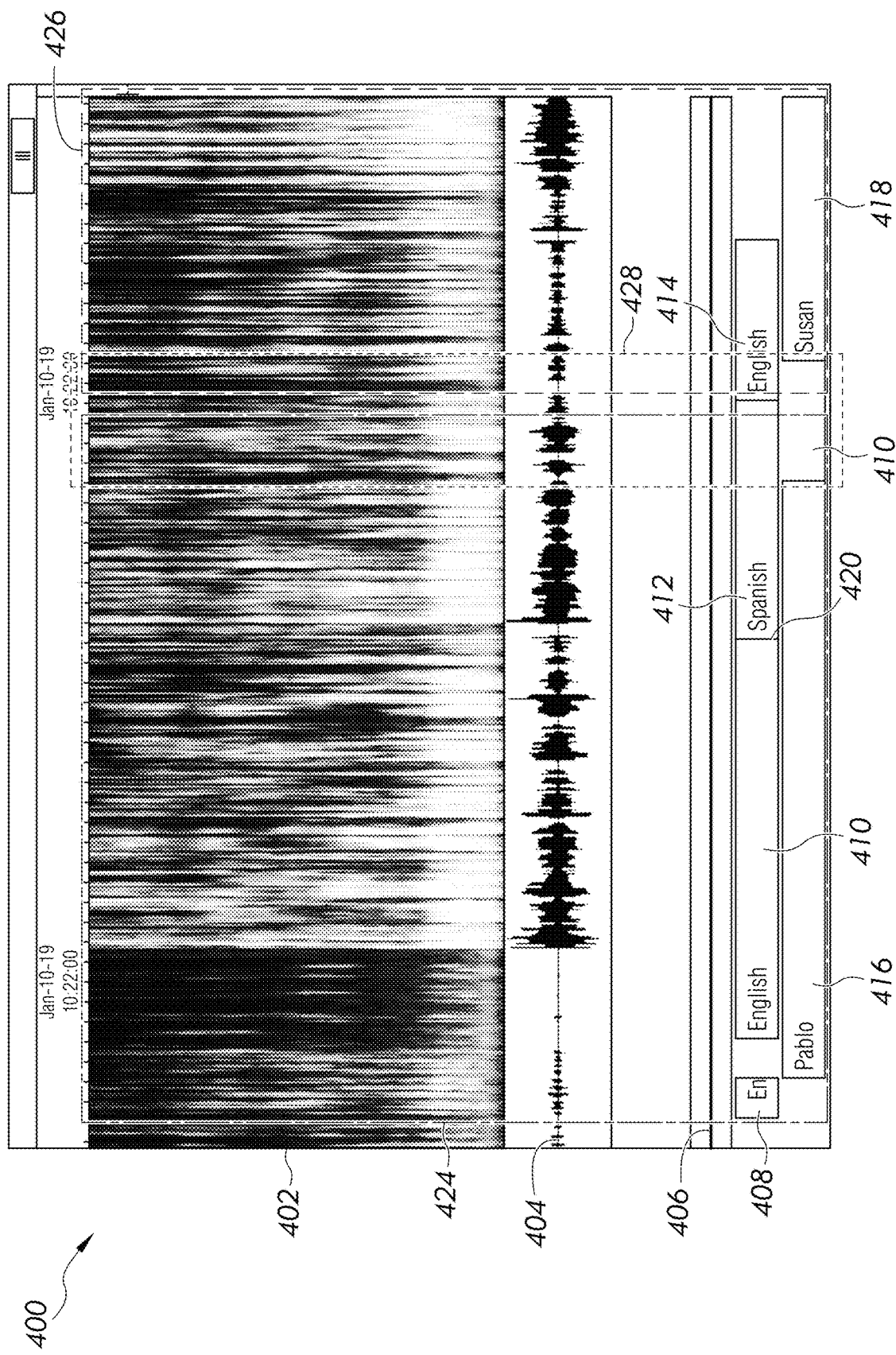
FIG. 4 is an example of a screen capture of a graphical user interface, in an embodiment.

An illustrative, nonlimiting example of a graphical user interface that displays labels that may be produced by operation 16 or downstream processing is shown in FIG. 4, described below. As previously noted, any type of content classifier(s) that produce semantic labels can be used in conjunction with the disclosed technologies to produce any type of semantic label. For example, the labels may indicate that the audio contains a particular dialect or a particular type of audio event (such as the sound of a car or a person laughing).

Example Arrangement of Software-Based Components

Figure 2:
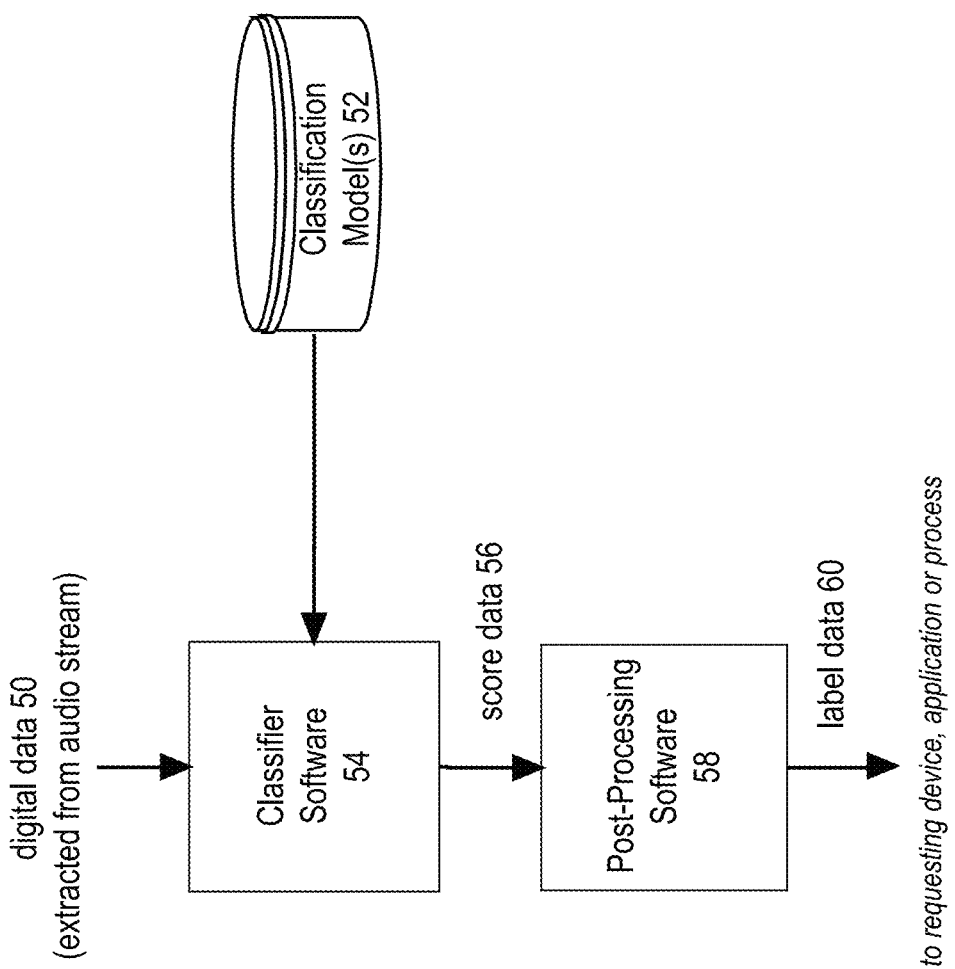
FIG. 2 is a block diagram of a software-based system, in an embodiment.

FIG. 2 illustrates an example arrangement of software-based components in which aspects of the present disclosure may be implemented. In an embodiment, the software-based components include classification model(s) 52, classification software 54, post-processing software 58, as well as digital data 50, score data 56, label data 60. The software-based component(s) 52, 54, 56 in which process 100 is embodied are executable by processor(s); for example computing device(s) 110, 140, display device 142, audio capture device 144, shown in FIG. 3, described in more detail below.

In FIG. 2, digital data 50 is input to/received by classifier software 54. Digital data 50 includes features that have been extracted from an audio stream. Audio stream as used herein may refer to a live audio stream or an audio recording. As such, audio stream may refer to an analog or digital form of audio. While not specifically shown, it should be understood that any necessary pre-processing, such as analog to digital conversion and/or filtering, is performed on the audio stream using for example commonly accepted techniques, prior to or as part of the feature extraction process. In an embodiment, automated speech activity detection is performed to remove non-speech portions of the audio stream prior to the content analysis, which produces one or more semantic labels.

In an embodiment, bottleneck features are included in digital data 50. In another embodiment, digital data 50 includes raw features or low-level features and the bottleneck features are computed and extracted by classifier software 54. Illustrative, non-limiting examples of bottleneck features and techniques for extracting them are described in, for example, U.S. Pat. No. 9,336,781 and U.S. Patent Application Publication 2016-0248768, each of which is incorporated herein by this reference.

Using the digital data 50 and one or more classification model(s) 52, classifier software 54 computes the scores and sub-scores described above for each semantic class for which the model(s) 52 have been trained. For example, model(s) 52 may include speaker models and/or language models. In an embodiment, model(s) 52 are trained to recognize different semantic classes using training data such as enrollment samples.

A model 52 may be trained using positive and/or negative examples of a semantic class that is desired to be detected in the audio stream. For instance, a speaker model 52 may be trained using a sample of pre-recorded speech of a particular speaker and a background model. Similarly, a language model 52 may be trained using many samples of pre-recorded speech of a particular language and a background model. In an embodiment, model(s) 52 includes a speaker model for each particular speaker that is desired to be detected in the audio stream, a language model for each language that is desired to be detected in the audio stream. In an embodiment, model(s) 52 may include one or more models for unknown speakers and/or unknown languages. In other embodiments, unknown speakers are not modeled; for example, a decision of "unknown" indicates that the sample did not match any of the enrolled models. The precise configuration of model(s) 52 depends on the particular application or task for which the disclosed technologies are being used.

Classifier software 54 outputs score data 56 for use by post-processing software 58. Post-processing software 58 analyzes the score data 56, and uses the score data to make decisions about which semantic classes to link with different temporal windows and/or sub-windows of the audio stream. In doing so, classifier software 54 identifies semantic classes and semantic class transitions in the audio stream.

Classifier software 54 uses the semantic class transitions to perform segmentation on the audio stream. As a result of the segmentation, classifier software 54 links labels that identify the semantic classes and semantic class transitions with corresponding portions of the audio stream. Examples of labels include the name of a particular semantic class, such as the name of a particular speaker ("Pablo", "Barbara," "Unknown,") or the name of a particular language ("Spanish," "French," "Unknown").

Post-processing software 58 outputs label data 60. Label data 60 includes the name of a particular label and a time interval of the audio stream to which the label applies. In an embodiment, label data 60 is used to render graphical elements in a user interface that depicts a waveform of the audio stream. In an embodiment, the graphical elements are displayed in temporal alignment with the corresponding portions of the waveform that is displayed. Temporal alignment of the graphical elements with the waveform enables the semantic class transitions to be quickly and easily detected by viewing the graphical user interface.

In some embodiments, label data 60 is output for use by a requesting device, application or process. For example, label data 60 may be produced so that it can be received as input by an automated transcription service, an automated language translation service, an intelligent assistant, and/or other applications, processes, or devices.

Example Networked Computing Environment

Figure 3:
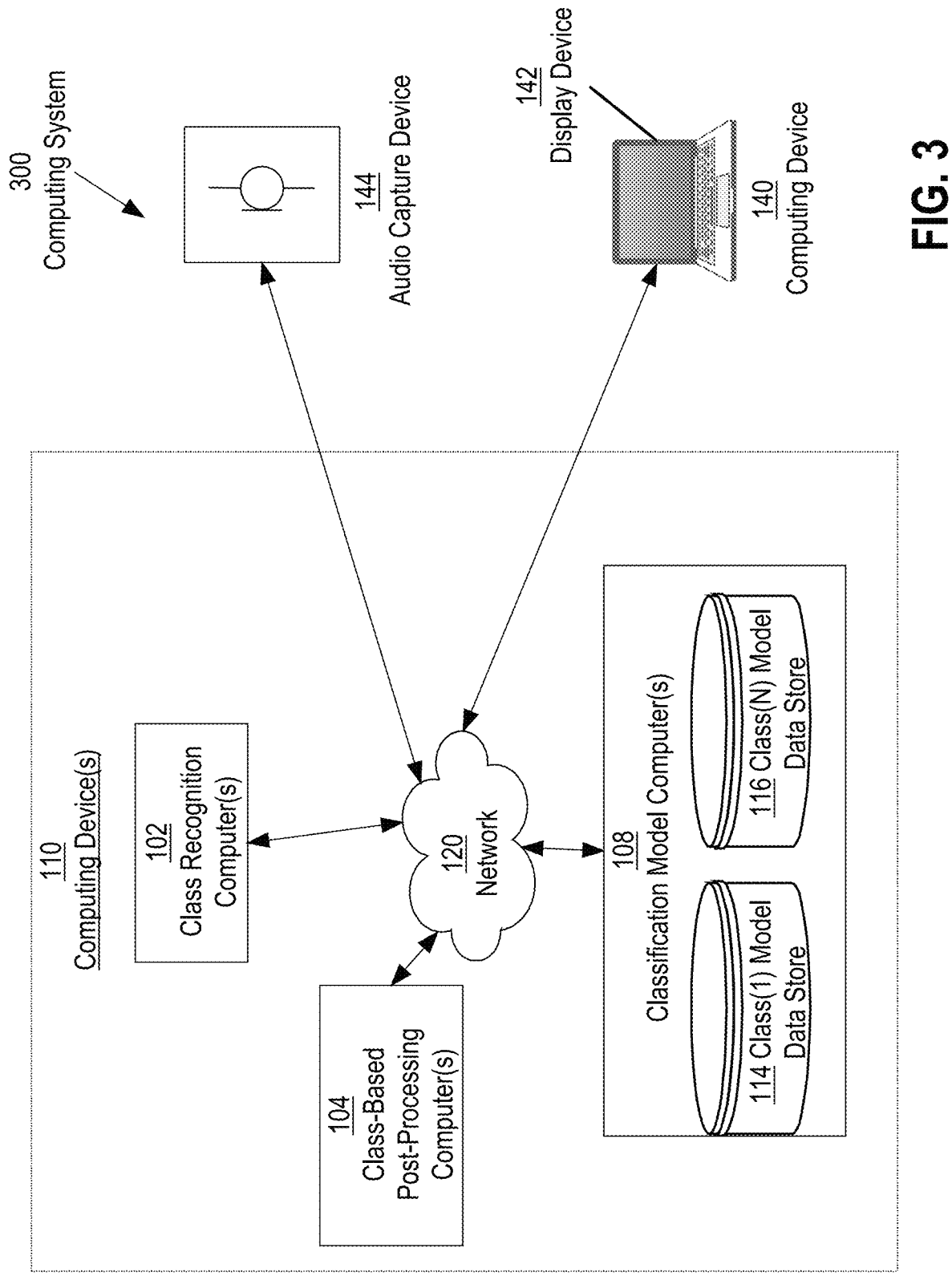
FIG. 3 is a block diagram of a networked computing environment, in an embodiment.

FIG. 3 illustrates an example computing system 300 in which aspects of the present disclosure may be implemented. In the example of FIG. 3, computing system 300 includes at least computing device(s) 110, a computing device 140, a display 142, and an audio capture device 144, which are communicatively coupled to an electronic communications network 120. In an embodiment, computing device 140 is a client computing device, such as a mobile computing device, smart phone, smart speaker, wearable computing device, smart appliance, laptop machine, or other computing device, while a computing device 110 is a server computer or network of server computers connected to the Internet, in the cloud, for example. In an embodiment, computing device 140 includes an embedded microphone and speaker, as well as a wireless or optical network interface for communicating with network 120.

Audio capture device 144 is any technological device that is capable of capturing an audio stream for processing and analysis by a computer, including but not limited to any type of microphone or microphone array. Audio capture device 144 may include a near field microphone, a far field microphone, or a combination of near field and far field microphones. Audio capture device 144 may be embedded in a computing device such as computing device 140, a push to talk (PTT) communication device, or a two-way radio transceiver, for example. In some embodiments, computing device 140 and audio capture device 144 communicate with network 120 by wireless, wired, and/or optical connections.

Implemented in computing devices 110, 140 using computer software, hardware, or software and hardware, are combinations of automated functionality, data structures, and digital data, which are represented schematically in FIG. 3 as class recognition computer(s) 102, class-based post-processing computer(s) 104, classification model computer(s) 108, class(1) data store 114, class(N) model data store 116.

In an embodiment, class recognition computer(s) 102 stores and operates portions of classifier software 54; class-based post-processing computer(s) 104 stores and operations portions of post-processing software 58; and classification model computer(s) 108 store and operate portions of classification model(s) 52, all of which are described above with reference to FIG. 2.

In FIG. 3, class(1) model data store 114 and class (N) data store 116 are used to store and operate N class models, where N is a positive integer. That is, an embodiment of computing system 300 may include any number of class models 114, 116. Examples of class models 114, 116 are speaker models, which can be used for speaker recognition, and language models, which can be used for language recognition. Class models 114, 116 can include models of other categories of speech content, such as particular acoustic events or particular keywords, gender, emotion, etc.

As used herein, the term model may refer to a combination of digital data and programming logic that embodies a computerized representation of logical and/or mathematical relationships between data elements. For example, a speaker model usable by a computer stores data that indicates relationships between audio feature data and speaker identifying data, while a language model usable by a computer stores data that indicates relationships between audio feature data and language identifying data. In short, a model tells the computer how to recognize a particular semantic class (such as speaker or language) when the computer processes an audio stream. Classifier software may use any one or more of the following types of models: a machine learning model, a neural network, a deep neural network, one or more models trained to recognize at least two different languages, one or more models trained to recognize at least two different speakers.

Although computing system 300 may be implemented with any number N, where N is a positive integer, of class recognition computer(s) 102, class-based post-processing computer(s) 104, calibration computer 106, classification model computer(s) 108, class (1) data store 114, class (N) model data store 116, computing devices 110, computing devices 140, display devices 142, audio capture devices 144, respectively, in this disclosure, these elements may be referred to in the singular form for ease of discussion. Also, class recognition computer(s) 102, class-based post-processing computer(s) 104, classification model computer(s) 108, class (1) data store 114, class (N) model data store 116, computing devices 110, computing device 140, display device 142, audio capture device 144, are shown as separate elements in FIG. 3 for ease of discussion but the illustration is not meant to imply that separation of these elements is required.

The illustrated systems and their functionality may be divided over any number of physical systems, including a single physical computer system, and can communicate with each other in any appropriate manner. For example, in some implementations, class recognition computer(s) 102, class-based post-processing computer(s) 104, classification model computer(s) 108, class (1) data store 114, class (N) model data store 116, computing device 110, computing device 140, display device 142, audio capture device 144, are all embodied in computing device 140.

Any of the components of computing system 300 may be equipped with input devices for purposes of obtaining input data. For example, computing device 140 may be equipped with or coupled to a keyboard, keypad, touchscreen, touch-pad, microphone, digital camera (still or video) or other sensing device(s) configured to obtain input data. Such input data is received by computing device 140 and routed to other components of the computing system 300 as described in this document or otherwise as needed.

Likewise, any of the components of computing system 300 may be equipped with output devices for purposes of presenting output. For example, computing device 140 may be equipped with or coupled to a display screen, touch screen, speaker, digital camera (still or video) or other output device(s) configured to output information. Such output data may be received from other components of the computing system 300 as described in this document or otherwise as needed. For example, a graphical user interface operated by computing device 140 may display graphics including dialog boxes and graphical content in order to facilitate the operations of any of the software components shown in FIG. 2.

In general, each of computing device(s) 110, 140, display device 142, audio capture device 144 and network 120 contains hardware components similar or analogous to corresponding components shown in FIG. 5, described below.

Network 120 may be implemented on any medium or mechanism that provides for the exchange of data between the devices that are connected to the network. Examples of network 120 include, without limitation, a network such as a Local Area Network (LAN), Wide Area Network (WAN), Ethernet or the Internet, or one or more terrestrial, satellite or wireless links. Network 120 may include a combination of networks, such as a combination of wired and wireless networks, as needed to enable communications between the computing device(s) 110, 140, 142.

Computing device 140 interfaces with computing devices 110 to establish logical connection(s) over network 120 with portions of class recognition computer(s) 102, class-based post-processing computer(s) 104, and classification model computer(s) 108, at various times as needed for the operation of computing system 300.

Use Example: Real-Time Speaker and Language Labeling

FIG. 4 is an example of a screen capture of a graphical user interface (GUI) 400 in which labels output by the disclosed technologies may be displayed, in an embodiment.

GUI 400 includes a real-time display of digital data extracted from an audio stream that has been captured by an audio capture device such as device 144. The real-time display moves from the right side of the page to the left side of the page to show new data as time elapses while the audio stream is being received or played, as the case may be. The real-time display includes frequency (band) data 402, amplitude (waveform) data 404, a speech activity detection indicator 406, labels 408, 410, 412, 414, 416, 418, examples of transitions 420, 422, and examples of segments 424, 426, 428.

Labels 408, 410, 412, 414, 416, 418, examples of transitions 420, 422, and examples of segments 424, 426, 428 are produced as a result of the disclosed technologies operating in communication with GUI 400. Labels 408, 410, 412, 414 identify languages detected by the classifier software in the audio stream. Labels 416, 418 indicate speakers whose speech is detected by the classifier software in the audio stream.

Transition 420 indicates a transition from a first language (English) to a second language (Spanish) detected by the disclosed software in the audio stream during speech by a first speaker (Pablo). That is, transition 420 indicates that the first speaker spoke two different languages and further indicates that the first speaker spoke English first and then switched to Spanish (and then back to English as indicated by label 414).

Transition 422 indicates a time interval in which both speaker 1 and a speaker 2 (Susan) were speaking and also indicates a time interval in which the language being spoken switched from Spanish (by Pablo) to English (by Susan). Thus transition 422 indicates both a change in speakers and a change in language.

Segment 424 identifies a time interval in which the audio stream contains speech only by speaker 1 (Pablo) spoken in two different languages. Segment 426 indicates a time interval in which the audio stream contains speech only by speaker 2 (Susan) in only one language (English). Segment 428 indicates a time interval in which the audio stream contains speech of speaker 1 speaking a first language (Pablo speaking Spanish) and also contains speech of speaker 2 speaking a second language (Susan speaking English).

In this way, GUI 400 illustrates an example of how the disclosed technologies can be used to segment a file in multiple different ways depending on the needs of the particular application, process or device that is the recipient of the segmentation information. Using the speaker and language labels that are produced by the disclosed technologies at the same time as the audio stream is being captured, audio segments can be defined using any combination of these labels. For example, in addition to the above examples, separate segments could be defined for speaker 1 only speaking English and Speaker 1 only speaking Spanish.

The ability to divide a particular speaker's speech into different language segments notwithstanding the presence of multiple speakers can be very useful for many different applications, including but not limited to automated transcription. Moreover, the ability to link particular languages with particular speakers in real time can be used to extract additional insights from the audio stream and potentially to personalize downstream services to the particular speaker.

Other Applications

While this disclosure describes embodiments that analyze live audio streams, aspects of the disclosed technologies are equally applicable to other forms of audio data, including but not limited to pre-recorded audio stored in digital audio files. Also, while this disclosure describes embodiments that segment audio based on language and/or speaker classifications, aspects of the disclosed technologies are equally applicable to other types of semantic classifications of the captured audio, including but not limited to speaker demographics such as age or gender, speaker emotional state, speaker physiological state, and/or classifications of non-speech audio such as types of background noise, types of sounds, sound volume, etc.

Example Hardware Implementation

According to one embodiment, the techniques described herein are implemented by at least one computing device. For example, portions of the disclosed technologies may be at least temporarily implemented on a network including a combination of at least one server computer and/or other computing devices. The computing devices may be hardwired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, personal computers, or a network of server computers and/or personal computers. Illustrative examples of computers are desktop computer systems, portable computer systems, handheld devices, mobile computing devices, wearable devices, body mounted or implantable devices, smart phones, smart appliances, networking devices, autonomous or semi-autonomous devices such as robots or unmanned ground or aerial vehicles, or any other electronic device that incorporates hard-wired and/or program logic to implement the described techniques.

Figure 5:
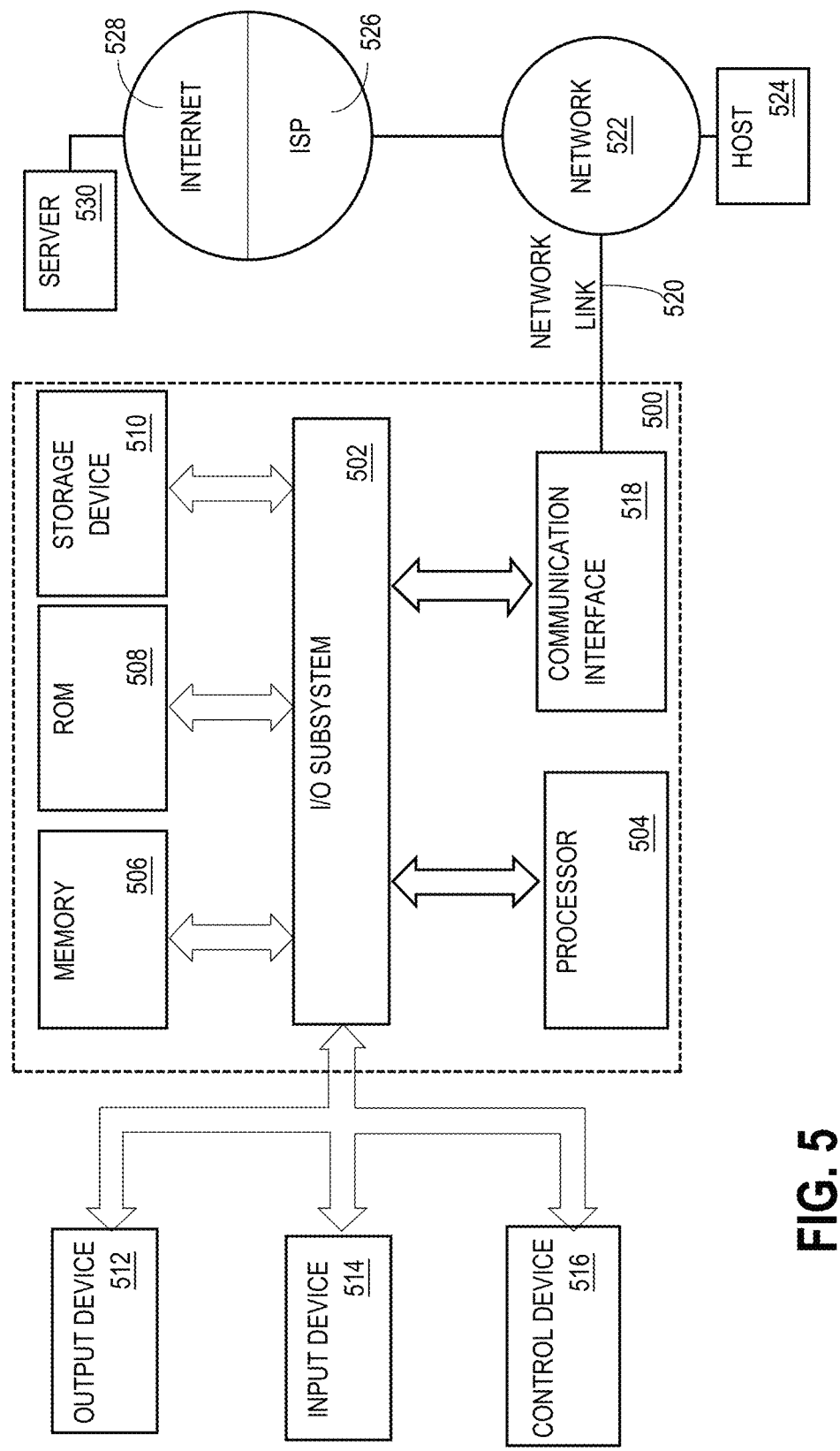
FIG. 5 is a block diagram that illustrates a hardware environment upon which an embodiment of the invention may be implemented.

For example, FIG. 5 is a block diagram that illustrates a computer system 500 upon which an embodiment of the present invention may be implemented. Components of the computer system 500, including instructions for implementing the disclosed technologies in hardware, software, or a combination of hardware and software, are represented schematically in the drawings, for example as boxes and circles.

Computer system 500 includes an input/output (I/O) subsystem 502 which may include a bus and/or other communication mechanism(s) for communicating information and/or instructions between the components of the computer system 500 over electronic signal paths. The I/O subsystem may include an I/O controller, a memory controller and at least one I/O port. The electronic signal paths are represented schematically in the drawings, for example as lines, unidirectional arrows, or bidirectional arrows.

At least one hardware processor 504 is coupled with I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor.

Computer system 500 also includes a memory 506 such as a main memory, which is coupled to I/O subsystem 502 for storing information and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, render computer system 500 into a special-purpose machine that is customized to perform the operations specified in the instructions.

Computer system 500 further includes a non-volatile memory such as read only memory (ROM) 508 or other static storage device coupled to I/O subsystem 502 for storing static information and instructions for processor 504. The ROM 508 may include various forms of programmable ROM (PROM) such as erasable PROM (EPROM) or electrically erasable PROM (EEPROM). A persistent storage device 510 may include various forms of non-volatile RAM (NVRAM), such as flash memory, or solid-state storage, magnetic disk or optical disk, and may be coupled to I/O subsystem 502 for storing information and instructions.

Computer system 500 may be coupled via I/O subsystem 502 to at least one output device 512 such as a display device. Display 512 may be embodied as, for example, a touch screen display or a light-emitting diode (LED) display or a liquid crystal display (LCD) for displaying information, such as to a computer user. Computer system 500 may include other type(s) of output devices, such as speakers, LED indicators and haptic devices, alternatively or in addition to a display device.

At least one input device 514 is coupled to I/O subsystem 502 for communicating signals, information and command selections to processor 504. Types of input devices 514 include touch screens, microphones, still and video digital cameras, alphanumeric and other keys, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be implemented as a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

Computer system 500 may implement the techniques described herein using customized hard-wired logic, at least one ASIC or FPGA, firmware and/or program logic which in combination with the computer system causes or programs computer system 500 to operate as a special-purpose machine. According to one embodiment, the techniques herein are performed by computer system 500 in response to processor 504 executing at least one sequence of at least one instruction contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying at least one sequence of at least one instruction to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage device 510 either before or after execution by processor 504.

Computer system 500 also includes a communication interface 518 coupled to bus 502. Communication interface 518 provides a two-way data communication coupling to network link(s) 520 that are directly or indirectly connected to at least one communication networks, such as a local network 522 or a public or private cloud on the Internet. For example, communication interface 518 may be an integrated-services digital network (ISDN) card, cable modem, satellite modem, or a modem to provide a data communication connection to a corresponding type of communications line, for example a coaxial cable or a fiber-optic line or a telephone line. As another example, communication interface 518 may include a local area network (LAN) card to provide a data communication connection to a compatible LAN. Wireless links may also be implemented. In any such implementation, communication interface 518 sends and receives electrical, electromagnetic or optical signals over signal paths that carry digital data streams representing various types of information.

Network link 520 typically provides electrical, electromagnetic, or optical data communication directly or through at least one network to other data devices, using, for example, cellular, Wi-Fi, or BLUETOOTH technology. For example, network link 520 may provide a connection through a local network 522 to a host computer 524 or to other computing devices, such as personal computing devices or Internet of Things (IoT) devices and/or data equipment operated by an Internet Service Provider (ISP) 526. ISP 526 provides data communication services through the world-wide packet data communication network commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution.

Experimental Data

FIG. 6A is an example of a plot of content-based segmentations for an audio file with multiple language transitions of multiple different languages by the same speaker, using the soft approach. In FIG. 6A, areas 602, 604, 606 represent transitions between languages. For example, in area 602, the system-detected language is transitioning from English to Spanish. Similarly, in area 604, system-detected language is transitioning from Spanish to Russian, and in area 606 the system-detected language is transitioning from English to French.

Table 1 below illustrates an example of how the disclosed technologies can be used to provide fast classification and output of semantic labels, including label corrections that can increase user confidence in the classifications that the system produces. The example of Table 1 uses data from FIG. 6A, which illustrates an embodiment of the disclosed soft solution.

TABLE 1

Example of Real-Time Speech Content Classification

| Time (seconds) | Score | Initial Label | Corrective Label |
|---|---|---|---|
| 0 | 0 | (no speech)* | (none) |
| 4-14 | 5-9 | English | (none) |
| 15-18 | 0 | English | Spanish |
| 19-28 | 6 | Spanish | (none) |
| 29-35 | 0-2 | Spanish | Russian |
| 36-42 | 4-8 | English | (none) |
| 43-45 | 0-5 | English | French |
| 46-52 | 9 | French | (none) |
| 60 | 0 | (none) | (none) |

Table 1 in conjunction with FIG. 6A shows that the disclosed technologies can make fast (e.g., in under 4 seconds) initial content classifications. In an embodiment, the disclosed technologies retain the prior label through a transition until and unless a corrective label is determined. For example, during time 15-18 seconds, the speaker(s) transitioned from English to Spanish. An embodiment of the disclosed technologies outputs "English" as the language label for time 15-18 seconds, but then revises the label for that segment to Spanish once the system has enough data to determine with higher confidence that the language has switched to Spanish.

Similarly, the system generates corrective labels to replace the initial labels at times 29-35 seconds and 43-45 seconds. In this way, embodiments of the disclosed technologies can provide both improved speed and accuracy of speech content classification systems. These improvements may be particularly useful in live streaming environments in which the label output needs to be determined quickly in order to keep up with the live stream.

FIG. 6B is an example of a plot of content-based segmentations for the same audio file as FIG. 6A, with 7 language transitions of multiple different languages by the same speaker, using the hard approach. In FIG. 6B, areas 610, 612, 614, 616 represent transitions between languages. For example, in area 610, the system-detected language is transitioning from English to Spanish. Similarly, in area 612, the system-detected language is transitioning from Spanish to Russian. In area 614, the system-detected language is transitioning from Russian to English, and in area 616 the system-detected language is transitioning from English to French. Note that the system is able to more easily detect the transition in area 612 from Spanish to Russian using the hard approach rather than the soft approach.

FIG. 6A shows the interpolated scores for each language and each window with the soft segmentation approach, and FIG. 6B shows the classification decisions for the same file, using the hard segmentation approach. Table 2 below indicates error rates for both approaches.

TABLE 2

Diarization error rates for soft and hard language segmentation systems.

|  | SpkErr | DER |
|---|---|---|
| Soft Segmentation | 21.099 | 23.777 |
| Hard Segmentation | 22.509 | 25.126 |

Table 2 shows that both the hard and soft approaches have similar behavior with respect to the audio file used in the experiment.

The hard and soft segmentation approaches have been tested with audio files of different speakers speaking different languages, in order to test the system in different conditions. The results are shown in Table 3 below.

TABLE 3

Diarization error rates of hard and soft language segmentation systems with 8 sec. window for different files with different languages.

|  | SpkErr | DER |
|---|---|---|
| HARD |  |  |
| Speaker1.wav | 4.975 | 9.891 |
| Speaker2.wav | 41.171 | 45.131 |
| Speaker3.wav | 22.509 | 25.126 |
| Speaker4.wav | 18.967 | 23.350 |
| Speaker5.wav | 20.668 | 20.724 |
| AVERAGE | 21.658 | 24.844 |
| SOFT |  |  |
| Speaker1.wav | 5.851 | 10.806 |
| Speaker2.wav | 35.738 | 39.755 |
| Speaker3.wav | 23.113 | 25.790 |
| Speaker4.wav | 26.454 | 30.942 |
| Speaker5.wav | 16.489 | 16.583 |
| AVERAGE | 21.529 | 24.775 |

Table 3 shows that the highest error rate occurred when the speaker changed from one language to another language constantly, where the 2 languages had very similar pronunciation (Portuguese and Spanish, in speaker2.wav).

ADDITIONAL EXAMPLES

Illustrative examples of the technologies disclosed herein are provided below. An embodiment of the technologies may include any of the examples or a combination of portions of the examples described below.

In an example 1, a method for automatically recognizing speech content of an audio stream that may contain multiple different classes of speech content includes: receiving, by an audio capture device, an audio stream; outputting, by one or more classifiers, in response to an inputting to the one or more classifiers of digital data that has been extracted from the audio stream, score data; where a score of the score data indicates a likelihood that a particular time segment of the audio stream contains speech of a particular class; where the one or more classifiers use one or more machine-learned models that have been trained to recognize audio of one or more particular classes to determine the score data; using a sliding time window process, selecting particular scores from the score data; using the selected particular scores, determining and outputting one or more decisions as to whether one or more particular time segments of the audio stream contain speech of one or more particular classes; where the one or more decisions are outputted within a real-time time interval of the receipt of the audio stream; where the one or more decisions are used by downstream processing of the audio stream to control any one or more of the following: labeling the audio stream, segmenting the audio stream, diarizing the audio stream; where the method is performed by one or more computing devices.

An example 2 includes the subject matter of example 1, where the sliding time window process includes: determining a time window having a start time and a maximum window size; determining a sub-window size that is less than the maximum window size; extracting the particular scores for a particular class from output of the one or more classifiers over a sequence of time intervals each having the sub-window size until the maximum window size is reached; determining a decision for the particular class using score data that corresponds to a midpoint of the time window. An example 3 includes the subject matter of example 2, including: determining a new time window by incrementing the start time by the sub-window size; repeating the extracting the particular scores and the determining the decision using the new time window. An example 4 includes the subject matter of any of examples 1-3, where the sliding time window process includes: determining a time window having a start time and a maximum window size; determining a midpoint of the time window; extracting the particular scores for a particular class over a sequence of time intervals until the midpoint of the time window is reached; determining a maximum value of the particular scores for the particular class; using the maximum value to determine the decision for the particular class. An example 5 includes the subject matter of any of examples 1-4, including: outputting an initial label in a first response time after the receiving of a portion of the audio stream; outputting a corrective label that improves an accuracy of the initial label in a second response time after the first response time. An example 6 includes the subject matter of any of examples 1-5, where the one or more classifiers have been trained to perform any one or more of: automatic speaker recognition, automatic language recognition, automatic acoustic event recognition, automatic keyword recognition, automatic emotion recognition, automatic gender recognition. An example 7 includes the subject matter of any of examples 1-6, where the one or more classifiers use any one or more of: a machine learning model, a neural network, a deep neural network, one or more bottleneck features, one or more models trained to recognize at least two different languages, one or more models trained to recognize at least two different speakers. An example 8 includes the subject matter of any of examples 1-7, including concurrently displaying, in a graphical user interface, a waveform of the audio stream, a first label that links a first speaker with a first portion of the waveform, and a second label that links a first language with a second portion of the waveform. An example 9 includes the subject matter of example 8, where the second portion of the waveform is a sub-portion of the first portion of the waveform. An example 10 includes the subject matter of any of examples 1-9, further including concurrently displaying a third label that links a second language with a third portion of the waveform. An example 11 includes the subject matter of any of examples 1-10, where the third portion of the waveform is a sub-portion of the first portion of the waveform. An example 12 includes the subject matter of any of examples 1-11, including concurrently displaying, in a graphical user interface, a waveform of the audio stream, a first label that links a first speaker with a first portion of the waveform, a second label that links a second speaker with a second portion of the waveform; a third label that links a first language with the first portion of the waveform, and a fourth label that links a second language with the second portion of the waveform.

In an example 13, one or more non-transitory computer-readable storage media including instructions which, when executed by one or more processors, cause: receiving, by an audio capture device, an audio stream; outputting, by one or more classifiers, in response to an inputting to the one or more classifiers of digital data that has been extracted from the audio stream, score data; where a score of the score data indicates a likelihood that a particular time segment of the audio stream contains speech of a particular class; where the one or more classifiers use one or more machine-learned models that have been trained to recognize audio of one or more particular classes to determine the score data; using a sliding time window process, selecting particular scores from the score data; using the selected particular scores, determining and outputting one or more decisions as to whether one or more particular time segments of the audio stream contain speech of one or more particular classes; where the one or more decisions are outputted within a real-time time interval of the receipt of the audio stream; where the one or more decisions are used by downstream processing of the audio stream to control any one or more of the following: labeling the audio stream, segmenting the audio stream, diarizing the audio stream.

An example 14 includes the subject matter of example 13, where the sliding time window process includes: determining a time window having a start time and a maximum window size; determining a sub-window size that is less than the maximum window size; extracting the particular scores for a particular class from output of the one or more classifiers over a sequence of time intervals each having the sub-window size until the maximum window size is reached; determining a decision for the particular class using score data that corresponds to a midpoint of the time window. An example 15 includes the subject matter of example 14, where the instructions, when executed by one or more processors, cause: determining a new time window by incrementing the start time by the sub-window size; repeating the extracting the particular scores and the determining the decision using the new time window. An example 16 includes the subject matter of any of examples 13-15, where the sliding time window process includes: determining a time window having a start time and a maximum window size; determining a midpoint of the time window; extracting the particular scores for a particular class over a sequence of time intervals until the midpoint of the time window is reached; determining a maximum value of the particular scores for the particular class; using the maximum value to determine the decision for the particular class. An example 17 includes the subject matter of any of examples 13-16, where the instructions, when executed by one or more processors, cause: outputting an initial label in a first response time after the receiving of a portion of the audio stream; outputting a corrective label that improves an accuracy of the initial label in a second response time after the first response time. An example 18 includes the subject matter of any of examples 13-17, where the one or more classifiers have been trained to perform any one or more of: automatic speaker recognition, automatic language recognition, automatic acoustic event recognition, automatic keyword recognition, automatic emotion recognition, automatic gender recognition. An example 19 includes the subject matter of any of examples 13-18, where the one or more classifiers use any one or more of: a machine learning model, a neural network, a deep neural network, one or more bottleneck features, one or more models trained to recognize at least two different languages, one or more models trained to recognize at least two different speakers. An example 20 includes the subject matter of any of examples 13-19, where the instructions, when executed by one or more processors, cause concurrently displaying, in a graphical user interface, a waveform of the audio stream, a first label that links a first speaker with a first portion of the waveform, and a second label that links a first language with a second portion of the waveform. An example 21 includes the subject matter of example 20, where the second portion of the waveform is a sub-portion of the first portion of the waveform. An example 22 includes the subject matter of example 21, where the instructions, when executed by one or more processors, cause concurrently displaying a third label that links a second language with a third portion of the waveform. An example 23 includes the subject matter of example 22, where the third portion of the waveform is a sub-portion of the first portion of the waveform. An example 24 includes the subject matter of any of examples 13-23, where the instructions, when executed by one or more processors, cause concurrently displaying, in a graphical user interface, a waveform of the audio stream, a first label that links a first speaker with a first portion of the waveform, a second label that links a second speaker with a second portion of the waveform; a third label that links a first language with the first portion of the waveform, and a fourth label that links a second language with the second portion of the waveform.

In an example 25, a system includes: one or more processors; one or more storage media storing instructions which, when executed by the one or more processors, cause: receiving, by an audio capture device, an audio stream; outputting, by one or more classifiers, in response to an inputting to the one or more classifiers of digital data that has been extracted from the audio stream, score data; where a score of the score data indicates a likelihood that a particular time segment of the audio stream contains speech of a particular class; where the one or more classifiers use one or more machine-learned models that have been trained to recognize audio of one or more particular classes to determine the score data; using a sliding time window process, selecting particular scores from the score data; using the selected particular scores, determining and outputting one or more decisions as to whether one or more particular time segments of the audio stream contain speech of one or more particular classes; where the one or more decisions are outputted within a real-time time interval of the receipt of the audio stream; where the one or more decisions are used by downstream processing of the audio stream to control any one or more of the following: labeling the audio stream, segmenting the audio stream, diarizing the audio stream.

An example 26 includes the subject matter of example 25, where the sliding time window process includes: determining a time window having a start time and a maximum window size; determining a sub-window size that is less than the maximum window size; extracting the particular scores for a particular class from output of the one or more classifiers over a sequence of time intervals each having the sub-window size until the maximum window size is reached; determining a decision for the particular class using score data that corresponds to a midpoint of the time window. An example 27 includes the subject matter of example 26, where the instructions, when executed by one or more processors, cause: determining a new time window by incrementing the start time by the sub-window size; repeating the extracting the particular scores and the determining the decision using the new time window. An example 28 includes the subject matter of any of examples 25-27, where the sliding time window process includes: determining a time window having a start time and a maximum window size; determining a midpoint of the time window; extracting the particular scores for a particular class over a sequence of time intervals until the midpoint of the time window is reached; determining a maximum value of the particular scores for the particular class; using the maximum value to determine the decision for the particular class. An example 29 includes the subject matter of any of examples 25-28, where the instructions, when executed by one or more processors, cause: outputting an initial label in a first response time after the receiving of a portion of the audio stream; outputting a corrective label that improves an accuracy of the initial label in a second response time after the first response time. An example 30 includes the subject matter of any of examples 25-29, where the one or more classifiers have been trained to perform any one or more of: automatic speaker recognition, automatic language recognition, automatic acoustic event recognition, automatic keyword recognition, automatic emotion recognition, automatic gender recognition. An example 31 includes the subject matter of any of examples 25-30, where the one or more classifiers use any one or more of: a machine learning model, a neural network, a deep neural network, one or more bottleneck features, one or more models trained to recognize at least two different languages, one or more models trained to recognize at least two different speakers. An example 32 includes the subject matter of any of examples 25-31, where the instructions, when executed by one or more processors, cause concurrently displaying, in a graphical user interface, a waveform of the audio stream, a first label that links a first speaker with a first portion of the waveform, and a second label that links a first language with a second portion of the waveform. An example 33 includes the subject matter of example 32, where the second portion of the waveform is a sub-portion of the first portion of the waveform. An example 34 includes the subject matter of example 33, where the instructions, when executed by one or more processors, cause concurrently displaying a third label that links a second language with a third portion of the waveform. An example 35 includes the subject matter of example 34, where the third portion of the waveform is a sub-portion of the first portion of the waveform. An example 36 includes the subject matter of any of examples 25-35, where the instructions, when executed by one or more processors, cause concurrently displaying, in a graphical user interface, a waveform of the audio stream, a first label that links a first speaker with a first portion of the waveform, a second label that links a second speaker with a second portion of the waveform; a third label that links a first language with the first portion of the waveform, and a fourth label that links a second language with the second portion of the waveform.

GENERAL CONSIDERATIONS

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

As used herein the terms "include" and "comprise" (and variations of those terms, such as "including," "includes," "comprising," "comprises," "comprised" and the like) are intended to be inclusive and are not intended to exclude further features, components, integers or steps.

References in this document to "an embodiment," etc., indicate that the embodiment described or illustrated may include a particular feature, structure, or characteristic, but every embodiment may not necessarily include the particular feature, structure, or characteristic. Such phrases are not necessarily referring to the same embodiment. Further, when a particular feature, structure, or characteristic is described or illustrated in connection with an embodiment, it is believed to be within the knowledge of one skilled in the art to effect such feature, structure, or characteristic in connection with other embodiments whether or not explicitly indicated.

Various features of the disclosure have been described using process steps. The functionality/processing of a given process step could potentially be performed in different ways and by different systems or system modules. Furthermore, a given process step could be divided into multiple steps and/or multiple steps could be combined into a single step. Furthermore, the order of the steps can be changed without departing from the scope of the present disclosure.

What is claimed is:

1. A method for automatically recognizing speech content of an audio stream that may contain multiple different classes of speech content, the method comprising:
receiving, by an audio capture device, an audio stream;
outputting, by one or more classifiers, in response to an inputting to the one or more classifiers of digital data that has been extracted from the audio stream, score data;
wherein a score of the score data indicates a likelihood that a particular time segment of the audio stream contains speech of a particular class;
wherein the one or more classifiers use one or more machine-learned models that have been trained to recognize audio of one or more particular classes to determine the score data;
using a sliding time window process, selecting particular scores from the score data;
using the selected particular scores, determining and outputting one or more decisions as to whether one or more particular time segments of the audio stream contain speech of the one or more particular classes;
wherein the one or more decisions are outputted within a real-time time interval of the receipt of the audio stream;
wherein the one or more decisions are used by downstream processing of the audio stream to control any one or more of the following: labeling the audio stream, segmenting the audio stream, diarizing the audio stream;
wherein the sliding time window process comprises:
determining a time window having a start time and a maximum window size;
determining a sub-window size that is less than the maximum window size;
extracting the particular scores for a particular class from output of the one or more classifiers over a sequence of time intervals each having the sub-window size until the maximum window size is reached;
determining a decision for the particular class using score data that corresponds to a midpoint of the time window;
wherein the method is performed by one or more computing devices.

2. The method of claim 1, comprising:
determining a new time window by incrementing the start time by the sub-window size;
repeating the extracting the particular scores and the determining the decision using the new time window.

3. A method for automatically recognizing speech content of an audio stream that may contain multiple different classes of speech content, the method comprising:
receiving, by an audio capture device, an audio stream;
outputting, by one or more classifiers, in response to an inputting to the one or more classifiers of digital data that has been extracted from the audio stream, score data;
wherein a score of the score data indicates a likelihood that a particular time segment of the audio stream contains speech of a particular class;
wherein the one or more classifiers use one or more machine-learned models that have been trained to recognize audio of one or more particular classes to determine the score data;
using a sliding time window process, selecting particular scores from the score data;
using the selected particular scores, determining and outputting one or more decisions as to whether one or more particular time segments of the audio stream contain speech of the one or more particular classes;
wherein the one or more decisions are outputted within a real-time time interval of the receipt of the audio stream;
wherein the one or more decisions are used by downstream processing of the audio stream to control any one or more of the following: labeling the audio stream, segmenting the audio stream, diarizing the audio stream;
wherein the sliding time window process comprises:
determining a time window having a start time and a maximum window size;
determining a midpoint of the time window;
extracting the particular scores for a particular class over a sequence of time intervals until the midpoint of the time window is reached;
determining a maximum value of the particular scores for the particular class;
using the maximum value to determine the decision for the particular class;
wherein the method is performed by one or more computing devices.

4. The method of claim 1, comprising:
outputting an initial label in a first response time after the receiving of a portion of the audio stream;
outputting a corrective label that improves an accuracy of the initial label in a second response time after the first response time.

5. The method of claim 1, wherein the one or more classifiers have been trained to perform any one or more of: automatic speaker recognition, automatic language recognition, automatic acoustic event recognition, automatic keyword recognition, automatic emotion recognition, automatic gender recognition.

6. The method of claim 1, wherein the one or more classifiers use any one or more of: a machine learning model, a neural network, a deep neural network, one or more bottleneck features, one or more models trained to recognize at least two different languages, one or more models trained to recognize at least two different speakers.

7. The method of claim 1, comprising concurrently displaying, in a graphical user interface, a waveform of the audio stream, a first label that links a first speaker with a first portion of the waveform, and a second label that links a first language with a second portion of the waveform.

8. The method of claim 7, wherein the second portion of the waveform is a sub-portion of the first portion of the waveform.

9. The method of claim 8, further comprising concurrently displaying a third label that links a second language with a third portion of the waveform.

10. The method of claim 9, wherein the third portion of the waveform is a sub-portion of the first portion of the waveform.

11. The method of claim 1, comprising concurrently displaying, in a graphical user interface, a waveform of the audio stream, a first label that links a first speaker with a first portion of the waveform, a second label that links a second speaker with a second portion of the waveform; a third label that links a first language with the first portion of the waveform, and a fourth label that links a second language with the second portion of the waveform.

12. One or more non-transitory computer-readable storage media comprising instructions which, when executed by one or more processors, cause:
receiving, by an audio capture device, an audio stream;
outputting, by one or more classifiers, in response to an inputting to the one or more classifiers of digital data that has been extracted from the audio stream, score data;
wherein a score of the score data indicates a likelihood that a particular time segment of the audio stream contains speech of a particular class;
wherein the one or more classifiers use one or more machine-learned models that have been trained to recognize audio of one or more particular classes to determine the score data;
using a sliding time window process, selecting particular scores from the score data;
using the selected particular scores, determining and outputting one or more decisions as to whether one or more particular time segments of the audio stream contain speech of the one or more particular classes;
wherein the one or more decisions are outputted within a real-time time interval of the receipt of the audio stream;
wherein the one or more decisions are used by downstream processing of the audio stream to control any one or more of the following: labeling the audio stream, segmenting the audio stream, diarizing the audio stream;
wherein the sliding time window process comprises:
determining a time window having a start time and a maximum window size;
determining a sub-window size that is less than the maximum window size;
extracting the particular scores for a particular class from output of the one or more classifiers over a sequence of time intervals each having the sub-window size until the maximum window size is reached;
determining a decision for the particular class using score data that corresponds to a midpoint of the time window.

13. The one or more non-transitory computer-readable storage media of claim 12, wherein the instructions, when executed by one or more processors, cause:
determining a new time window by incrementing the start time by the sub-window size;
repeating the extracting the particular scores and the determining the decision using the new time window.

14. One or more non-transitory computer-readable storage media comprising instructions which, when executed by one or more processors, cause:
receiving, by an audio capture device, an audio stream;
outputting, by one or more classifiers, in response to an inputting to the one or more classifiers of digital data that has been extracted from the audio stream, score data;
wherein a score of the score data indicates a likelihood that a particular time segment of the audio stream contains speech of a particular class;
wherein the one or more classifiers use one or more machine-learned models that have been trained to recognize audio of one or more particular classes to determine the score data;
using a sliding time window process, selecting particular scores from the score data;
using the selected particular scores, determining and outputting one or more decisions as to whether one or more particular time segments of the audio stream contain speech of the one or more particular classes;
wherein the one or more decisions are outputted within a real-time time interval of the receipt of the audio stream;
wherein the one or more decisions are used by downstream processing of the audio stream to control any one or more of the following: labeling the audio stream, segmenting the audio stream, diarizing the audio stream;
wherein the sliding time window process comprises:
determining a time window having a start time and a maximum window size;
determining a midpoint of the time window;
extracting the particular scores for a particular class over a sequence of time intervals until the midpoint of the time window is reached;
determining a maximum value of the particular scores for the particular class;
using the maximum value to determine the decision for the particular class.

15. The one or more non-transitory computer-readable storage media of claim 12, wherein the instructions, when executed by one or more processors, cause:
outputting an initial label in a first response time after the receiving of a portion of the audio stream;
outputting a corrective label that improves an accuracy of the initial label in a second response time after the first response time.

16. The one or more non-transitory computer-readable storage media of claim 12, wherein the one or more classifiers have been trained to perform any one or more of: automatic speaker recognition, automatic language recognition, automatic acoustic event recognition, automatic keyword recognition, automatic emotion recognition, automatic gender recognition.

17. The one or more non-transitory computer-readable storage media of claim 12, wherein the one or more classifiers use any one or more of: a machine learning model, a neural network, a deep neural network, one or more bottleneck features, one or more models trained to recognize at least two different languages, one or more models trained to recognize at least two different speakers.

18. The one or more non-transitory computer-readable storage media of claim 12, wherein the instructions, when executed by one or more processors, cause concurrently displaying, in a graphical user interface, a waveform of the audio stream, a first label that links a first speaker with a first portion of the waveform, and a second label that links a first language with a second portion of the waveform.

19. The one or more non-transitory computer-readable storage media of claim 18, wherein the second portion of the waveform is a sub-portion of the first portion of the waveform.

20. The one or more non-transitory computer-readable storage media of claim 19, wherein the instructions, when executed by one or more processors, cause concurrently displaying a third label that links a second language with a third portion of the waveform.

21. The one or more non-transitory computer-readable storage media of claim 20, wherein the third portion of the waveform is a sub-portion of the first portion of the waveform.

22. The one or more non-transitory computer-readable storage media of claim 12, wherein the instructions, when executed by one or more processors, cause concurrently displaying, in a graphical user interface, a waveform of the audio stream, a first label that links a first speaker with a first portion of the waveform, a second label that links a second speaker with a second portion of the waveform; a third label that links a first language with the first portion of the waveform, and a fourth label that links a second language with the second portion of the waveform.

23. A system comprising:
one or more processors;
one or more storage media storing instructions which, when executed by the one or more processors, cause:
receiving, by an audio capture device, an audio stream;
outputting, by one or more classifiers, in response to an inputting to the one or more classifiers of digital data that has been extracted from the audio stream, score data;
wherein a score of the score data indicates a likelihood that a particular time segment of the audio stream contains speech of a particular class;
wherein the one or more classifiers use one or more machine-learned models that have been trained to recognize audio of one or more particular classes to determine the score data;
using a sliding time window process, selecting particular scores from the score data;
using the selected particular scores, determining and outputting one or more decisions as to whether one or more particular time segments of the audio stream contain speech of the one or more particular classes;
wherein the one or more decisions are outputted within a real-time time interval of the receipt of the audio stream;
wherein the one or more decisions are used by downstream processing of the audio stream to control any one or more of the following: labeling the audio stream, segmenting the audio stream, diarizing the audio stream;
wherein the sliding time window process comprises:
determining a time window having a start time and a maximum window size;
determining a sub-window size that is less than the maximum window size;
extracting the particular scores for a particular class from output of the one or more classifiers over a sequence of time intervals each having the sub-window size until the maximum window size is reached;
determining a decision for the particular class using score data that corresponds to a midpoint of the time window.

24. The system of claim 23, wherein the instructions, when executed by one or more processors, cause:
determining a new time window by incrementing the start time by the sub-window size;
repeating the extracting the particular scores and the determining the decision using the new time window.

25. A system comprising:
one or more processors;
one or more storage media storing instructions which, when executed by the one or more processors, cause:
receiving, by an audio capture device, an audio stream;
outputting, by one or more classifiers, in response to an inputting to the one or more classifiers of digital data that has been extracted from the audio stream, score data;
wherein a score of the score data indicates a likelihood that a particular time segment of the audio stream contains speech of a particular class;
wherein the one or more classifiers use one or more machine-learned models that have been trained to recognize audio of one or more particular classes to determine the score data;
using a sliding time window process, selecting particular scores from the score data;
using the selected particular scores, determining and outputting one or more decisions as to whether one or more particular time segments of the audio stream contain speech of the one or more particular classes;
wherein the one or more decisions are outputted within a real-time time interval of the receipt of the audio stream;
wherein the one or more decisions are used by downstream processing of the audio stream to control any one or more of the following: labeling the audio stream, segmenting the audio stream, diarizing the audio stream;
wherein the sliding time window process comprises:
determining a time window having a start time and a maximum window size;
determining a midpoint of the time window;
extracting the particular scores for a particular class over a sequence of time intervals until the midpoint of the time window is reached;
determining a maximum value of the particular scores for the particular class;
using the maximum value to determine the decision for the particular class.

26. The system of claim 23, wherein the instructions, when executed by one or more processors, cause:
outputting an initial label in a first response time after the receiving of a portion of the audio stream;
outputting a corrective label that improves an accuracy of the initial label in a second response time after the first response time.

27. The system of claim 23, wherein the one or more classifiers have been trained to perform any one or more of: automatic speaker recognition, automatic language recognition, automatic acoustic event recognition, automatic keyword recognition, automatic emotion recognition, automatic gender recognition.

28. The system of claim 23, wherein the one or more classifiers use any one or more of: a machine learning model, a neural network, a deep neural network, one or more bottleneck features, one or more models trained to recognize at least two different languages, one or more models trained to recognize at least two different speakers.

29. The system of claim 23, wherein the instructions, when executed by one or more processors, cause concurrently displaying, in a graphical user interface, a waveform of the audio stream, a first label that links a first speaker with a first portion of the waveform, and a second label that links a first language with a second portion of the waveform.

30. The system of claim 29, wherein the second portion of the waveform is a sub-portion of the first portion of the waveform.

31. The system of claim 30, wherein the instructions, when executed by one or more processors, cause concurrently displaying a third label that links a second language with a third portion of the waveform.

32. The system of claim 31, wherein the third portion of the waveform is a sub-portion of the first portion of the waveform.

33. The system of claim 23, wherein the instructions, when executed by one or more processors, cause concurrently displaying, in a graphical user interface, a waveform of the audio stream, a first label that links a first speaker with a first portion of the waveform, a second label that links a second speaker with a second portion of the waveform; a third label that links a first language with the first portion of the waveform, and a fourth label that links a second language with the second portion of the waveform.

* * * * *

UNITED STATES PATENT AND TRADEMARK OFFICE
CERTIFICATE OF CORRECTION

PATENT NO. : 11,024,291 B2  
APPLICATION NO. : 16/366751  
DATED : June 1, 2021  
INVENTOR(S) : Castan Lavilla et al.

Page 1 of 1

It is certified that error appears in the above-identified patent and that said Letters Patent is hereby corrected as shown below:

On the Title Page

Item (72), should read:  
Diego Castan Lavilla, Mountain View, CA (US);  
Harry Bratt, Mountain View, CA (US);  
Mitchell Leigh McLaren, Alderley (AU);  
Aaron Lawson, Okotoks, CA Signed and Sealed this  
Twenty-sixth Day of April, 2022

Katherine Kelly Vidal  
*Director of the United States Patent and Trademark Office*